(12) United States Patent
Biewald et al.

(10) Patent No.: US 12,292,883 B1
(45) Date of Patent: May 6, 2025

(54) SNAPSHOT CHANGES FOR CLOUD SYSTEMS DURING ZERO DOWNTIME UPGRADES

(71) Applicant: SAP SE, Walldorf (DE)

(72) Inventors: Lars-Eric Biewald, Mannheim (DE); Andrea Klein, Waghäusel (DE); Stefan Runge, Mörlenbach (DE)

(73) Assignee: SAP SE, Walldorf (DE)

( * ) Notice: Subject to any disclaimer, the term of this patent is extended or adjusted under 35 U.S.C. 154(b) by 0 days.

(21) Appl. No.: 18/611,833

(22) Filed: Mar. 21, 2024

(51) Int. Cl.
*G06F 16/23* (2019.01)
*G06F 11/14* (2006.01)

(52) U.S. Cl.
CPC ...... *G06F 16/2379* (2019.01); *G06F 11/1469* (2013.01); *G06F 16/2358* (2019.01); *G06F 2201/80* (2013.01); *G06F 2201/84* (2013.01)

(58) Field of Classification Search
CPC .......... G06F 16/2379; G06F 16/2358
See application file for complete search history.

(56) References Cited

U.S. PATENT DOCUMENTS

| | | | |
|---|---|---|---|
| 9,361,093 B2 | 6/2016 | Meissner et al. | |
| 9,436,724 B2 | 9/2016 | Driesen et al. | |
| 9,477,447 B1 | 10/2016 | Weckwerth et al. | |
| 9,519,675 B2 | 12/2016 | Specht et al. | |
| 9,767,424 B2 | 9/2017 | Biewald et al. | |
| 10,013,315 B2 | 7/2018 | Biewald | |
| 10,055,215 B2 | 8/2018 | Specht et al. | |
| 10,402,185 B2 | 9/2019 | Biewald et al. | |
| 10,803,030 B2 | 10/2020 | Konrad et al. | |
| 2001/0011265 A1* | 8/2001 | Cuan | G06F 16/958 |

* cited by examiner

*Primary Examiner* — Baoquoc N To
(74) *Attorney, Agent, or Firm* — Fish & Richardson P.C.

(57) ABSTRACT

Implementations can include providing a snapshot table, replacing, in a first access schema, a first projection view with a union view, creating, in a second access schema, a snapshot projection view, a second projection view, and a set of database triggers, and during execution of an upgrade procedure that results in changes to records of the data table: recording the changes to the records of the data table in the snapshot table, for each record of the data table changed, providing the record in the snapshot table in an unchanged state through at least one database trigger and the snapshot projection view, and returning a set of records through the union view in response to a query, the set of records including a first sub-set of records of the data table and a second sub-set of records of the snapshot table.

20 Claims, 11 Drawing Sheets

SNAPSHOT CHANGES FOR CLOUD SYSTEMS DURING ZERO DOWNTIME UPGRADES

BACKGROUND

Entities, such as software developers and/or vendors, provide software and services. Example software can include enterprise software. In some examples, enterprise software can include application software (an application) that interacts with one or more databases. For example, an application can be hosted on one or more application servers and a user can interact with the application using a client device. In some examples, user interaction can result in data being read from, written to, and/or modified within one or more databases provided in one or more database systems.

During a lifecycle of the application and/or database, one or more maintenance operations may be required. Example maintenance operations include upgrading, patching, and testing. In order to perform such maintenance procedures, the application, and/or database may be taken offline, such that users are unable to interact with the application and/or database. This is referred to as downtime. Software providers strive to minimize downtime in an effort to achieve so-called zero-downtime during such maintenance procedures.

SUMMARY

Implementations of the present disclosure are directed to upgrading cloud-based software systems. More particularly, implementations of the present disclosure are directed to using snapshot tables and database triggers to enable production access to pre-upgrade data records using a first release during an upgrade procedure to a second release.

In some implementations, actions include providing, in a database system, a snapshot table, replacing, in a first access schema of an access layer, a first projection view that provides a view to records of a data table with a union view that provides a view to records of the data table and records of the snapshot table, creating, in a second access schema, a snapshot projection view, a second projection view, and a set of database triggers, and during execution of an upgrade procedure that results in changes to records of the data table: recording the changes to the records of the data table in the snapshot table, each change being implemented through the second projection view, for each record of the data table changed by the upgrade procedure, providing the record in the snapshot table in an unchanged state through at least one database trigger of the set of database triggers and the snapshot projection view, and returning a set of records through the union view in response to a query, the set of records including a first sub-set of records of the data table and a second sub-set of records of the snapshot table. Other implementations of this aspect include corresponding systems, apparatus, and computer programs, configured to perform the actions of the methods, encoded on computer storage devices.

These and other implementations can each optionally include one or more of the following features: in response to the query, the first sub-set of records includes records of the data table that are absent a corresponding record in the snapshot table; in response to the query, the second sub-set of records includes at least one record that had been deleted from the data table by the upgrade procedure; recording the changes to the records of the data table in the snapshot table includes, for each record, recording a type of change associated with the record; the set of database triggers includes one or more of an update trigger, a delete trigger, and an insert trigger; actions further include, after completion of the upgrade procedure, switching production access to the data table to be through the second access schema; and actions further include, prior to completion of the upgrade procedure, determining that the upgrade procedure is to be aborted, and, in response, restoring the data table to a pre-upgrade state using the snapshot table.

The present disclosure also provides a computer-readable storage medium coupled to one or more processors and having instructions stored thereon which, when executed by the one or more processors, cause the one or more processors to perform operations in accordance with implementations of the methods provided herein.

The present disclosure further provides a system for implementing the methods provided herein. The system includes one or more processors, and a computer-readable storage medium coupled to the one or more processors having instructions stored thereon which, when executed by the one or more processors, cause the one or more processors to perform operations in accordance with implementations of the methods provided herein.

It is appreciated that methods in accordance with the present disclosure can include any combination of the aspects and features described herein. That is, methods in accordance with the present disclosure are not limited to the combinations of aspects and features specifically described herein, but also include any combination of the aspects and features provided.

The details of one or more implementations of the present disclosure are set forth in the accompanying drawings and the description below. Other features and advantages of the present disclosure will be apparent from the description and drawings, and from the claims.

DESCRIPTION OF DRAWINGS

Like reference symbols in the various drawings indicate like elements.

DETAILED DESCRIPTION

Figure 1:
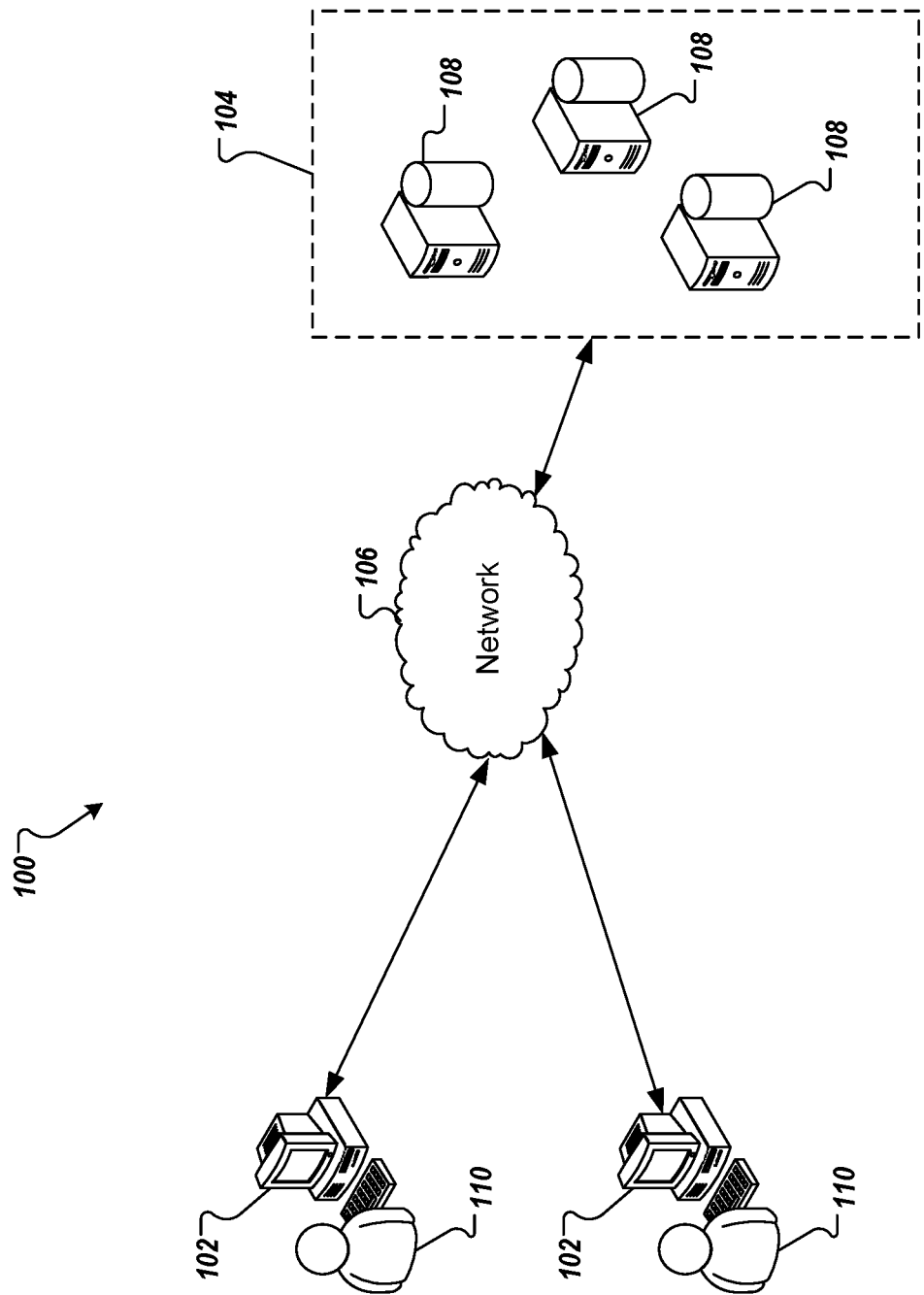
FIG. 1 depicts an example architecture that can be used to execute implementations of the present disclosure.

Implementations of the present disclosure are directed to upgrading cloud-based software systems. More particularly, implementations of the present disclosure are directed to using snapshot tables and database triggers to enable production access to pre-upgrade data records using a first release during an upgrade procedure to a second release.

Implementations can include actions of providing, in a database system, a snapshot table, replacing, in a first access schema of an access layer, a first projection view that provides a view to records of a data table with a union view that provides a view to records of the data table and records of the snapshot table, creating, in a second access schema, a snapshot projection view, a second projection view, and a set of database triggers, and during execution of an upgrade procedure that results in changes to records of the data table: recording the changes to the records of the data table in the snapshot table, each change being implemented through the second projection view, for each record of the data table changed by the upgrade procedure, providing the record in the snapshot table in an unchanged state through at least one database trigger of the set of database triggers and the snapshot projection view, and returning a set of records through the union view in response to a query, the set of records including a first sub-set of records of the data table and a second sub-set of records of the snapshot table.

Implementations of the present disclosure are described in further detail herein with non-limiting reference to an example software system. The example software system includes SAP S/4HANA Cloud Public Edition provided by SAP SE of Walldorf, Germany. SAP S/4HANA Cloud Public Edition can be described as a cloud-based enterprise resource planning (ERP) system that can be used to support multiple enterprise processes including, but not limited to, accounting, sales and distribution, production planning, material management, human capital management (HCM), supply chain management (SCM), and customer relationship management (CRM). It is contemplated, however, that implementations of the present disclosure can be realized with any appropriate software system.

To provide further context for implementations of the present disclosure, and as introduced above, during a lifecycle of a software system, one or more maintenance operations may be required. Example maintenance operations include upgrading, patching, and testing. In order to perform such maintenance procedures, the software system may be taken offline, such that users are unable to interact with the software system. This is referred to as downtime and software providers have strived to minimize downtime to achieve so-called zero-downtime during such maintenance procedures.

A maintenance operation, such as an upgrade, can be executed using a zero-downtime option, in which a view layer and database triggers are used to apply the upgrade in parallel with production use of the software system. Current approaches can require copying of hundreds to thousands of database tables to enable access to a first copy of the tables using a prior release (e.g., V1) during production use while the upgrade is conducted on the tables to the upgrade release (e.g., V2). This consumes a significant amount of technical resources, such as processors and memory during the upgrade. That is, because two copies of the tables are required, significant technical resources are consumed. Further, because the resources are only needed during the upgrade, the resources remain unused outside of the upgrade. That is, technical resources reserved for upgrade procedures remain idle and unused between upgrade procedures.

In view of the above context, implementations of the present disclosure provide are directed to upgrading software systems using so-called snapshot changes that enable table access by the upgrade version without copying (cloning) of the tables. In this manner, technical resources are saved during the upgrade procedure (e.g., reduced memory footprint) and unused, idle technical resources are avoided between upgrade procedures.

FIG. 1 depicts an example architecture 100 in accordance with implementations of the present disclosure. In the depicted example, the example architecture 100 includes a client device 102, a network 106, and a server system 104. The server system 104 includes one or more server devices and databases 108 (e.g., processors, memory). In the depicted example, a user 112 interacts with the client device 102.

In some examples, the client device 102 can communicate with the server system 104 over the network 106. In some examples, the client device 102 includes any appropriate type of computing device such as a desktop computer, a laptop computer, a handheld computer, a tablet computer, a personal digital assistant (PDA), a cellular telephone, a network appliance, a camera, a smart phone, an enhanced general packet radio service (EGPRS) mobile phone, a media player, a navigation device, an email device, a game console, or an appropriate combination of any two or more of these devices or other data processing devices. In some implementations, the network 106 can include a large computer network, such as a local area network (LAN), a wide area network (WAN), the Internet, a cellular network, a telephone network (e.g., PSTN) or an appropriate combination thereof connecting any number of communication devices, mobile computing devices, fixed computing devices and server systems.

In some implementations, the server system 104 includes at least one server and at least one data store. In the example of FIG. 1, the server system 104 is intended to represent various forms of servers including, but not limited to a web server, an application server, a proxy server, a network server, and/or a server pool. In general, server systems accept requests for application services and provides such services to any number of client devices (e.g., the client device 102 over the network 106).

In some implementations, one or more data stores of the server system 104 store one or more databases. In some examples, a database can be provided as an in-memory database. In some examples, an in-memory database is a database management system that uses main memory for data storage. In some examples, main memory includes random access memory (RAM) that communicates with one or more processors (e.g., central processing units (CPUs)), over a memory bus. An-memory database can be contrasted with database management systems that employ a disk storage mechanism. In some examples, in-memory databases are faster than disk storage databases, because internal optimization algorithms can be simpler and execute fewer CPU instructions, e.g., require reduced CPU consumption. In some examples, accessing data in an in-memory database eliminates seek time when querying the data, which provides faster and more predictable performance than disk-storage databases.

Implementations of the present disclosure are described in further detail herein with reference to an example context. The example context includes enterprise systems that are executed on a client-server architecture, such as the example architecture 100 of FIG. 1. In some examples, enterprise systems can be provided in a suite that includes two or more enterprise systems. Example enterprise systems can include an ERP system, such as SAP S/4HANA Cloud Public Edition introduced above. It is contemplated, however, that implementations of the present disclosure can be realized in any appropriate context (e.g., healthcare systems).

Referring again to FIG. 1, and in the example context, one or more enterprise systems can be hosted by the server system 104. A user 110 can interact with an enterprise system using the client device 102. More specifically, a session can be established between the client device 102 and one or more server devices 104, during which session the user 110 is able to interact with one or more enterprise systems hosted on the server system 104. The one or more enterprise systems can enable the user to interact with data stored in one or more databases. In some examples, interactions can result in data being stored to the database, deleted from the database, and/or edited within the database.

In some implementations, software systems undergo lifecycle management. In some examples, lifecycle management includes executing one or more maintenance procedures for an application and/or a database. Example maintenance procedures can include an upgrade procedure, a patch procedure, a customer configuration procedure, and development and testing procedures. An example upgrade procedure can include updating software. For example, an application can be updated from a first version (e.g., V1) to a second version (e.g., V2). An example update can include adding functionality to the application. As another example, a database can be updated from a first version (e.g., V1) to a second version (e.g., V2). An example update can be updating a data schema of the database. In some examples, a data schema (also referred to as database schema) is a data structure that defines how data is to be stored in the database. In some examples, the database schema can be defined in a formal language that is supported by a database management system (DBMS), and can include a set of formulas (also referred to as constraints) imposed on the database. In general, a data schema can be described as a catalog that specifies all database objects that can be stored in the database. In some examples, different data schemas (e.g., V1 versus V2) can have different objects with the same object name, but different structures.

As introduced above, the execution of maintenance procedures traditionally results in downtime (e.g., unavailability) of an application and/or a database. Implementations of the present disclosure enable zero downtime of the application and/or database during maintenance procedures. That is, implementations of the present disclosure provide continuous availability of an application and/or data during one or more maintenance procedures. In some examples, maintenance procedures can include an upgrade of the application (e.g., V1→V2).

FIGS. 2A-2D depict an example progression for an upgrade procedure in accordance with implementations of the present disclosure.

Figure 2A:
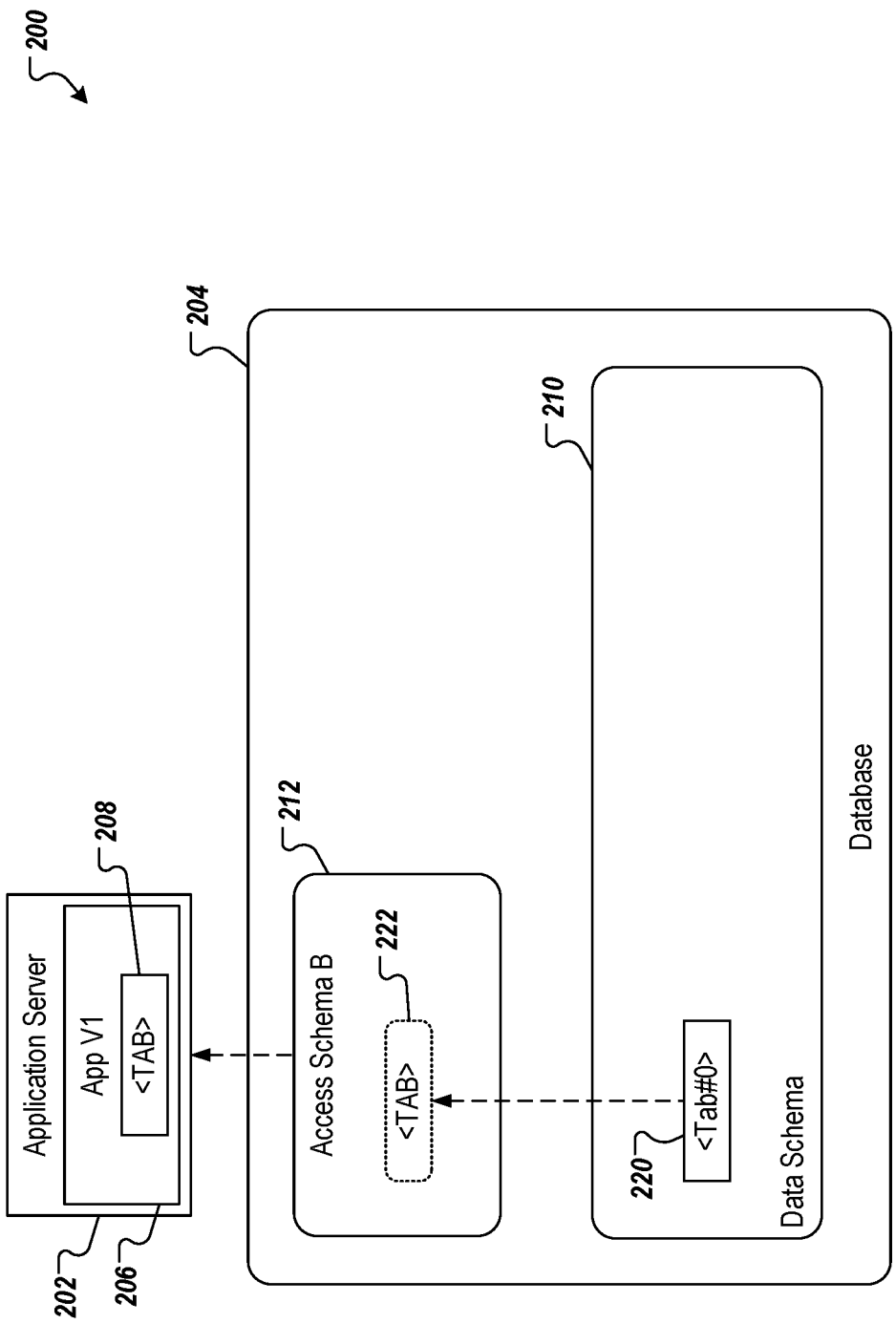
FIGS. 2A-2D depict an example progression for an upgrade procedure in accordance with implementations of the present disclosure.

With particular reference to FIG. 2A, a system 200 includes an application server 202 and a database system 204. The application server 202 represents an application layer and hosts one or more applications 206 (software systems), which corresponds to a first version (V1, source release). In some examples, the application 206 provides a table 208 based on a data dictionary definition. The table 208 is populated with values provided from the database system 204, as described in further detail herein.

In the example of FIG. 2A, the database system 204 includes a data schema 210 and an access schema 212 (blue access schema). The database system 204 stores a data table 220 that is populated with values. Although a single data table 220 is depicted, it is contemplated that the database system 204 can store hundreds to thousands of data tables. The access schema 212 includes a projection view 222 that enables at least a portion of the data values of the data table 220 to be provided as projected data to the application 206 (e.g., to populate the table 208). In some examples, projected data refers to data that can be read from a remote data source (e.g., a database) that is selectively exposed by the remote source (e.g., limited to one or more tables and certain fields of each table). In other terms, in response to a query (e.g., from the application 206), a projection view, such as the projection view 222, selects only particular fields of a table, such as the data table 220, and values stored therein. Although a single projection view is depicted, it is contemplated that the access schema 212 can include multiple projection views.

In some examples, the example of FIG. 2A represents production runtime (e.g., blue runtime) prior to execution of an upgrade procedure. During production, the application 206 can submit queries (e.g., SQL queries) to the database system 204 and values responsive to the queries are returned through the projection view 222. In the context of the present disclosure, an upgrade is to be performed to move from V1 to a second version (V2, target release). For example, the application 206 can be upgraded from V1 to V2. In the example of FIG. 2A, the application 206 is provided with read-only access to values stored in the data table 220. That is, the application 206 is unable to change values stored in the data table 220 and/or is unable to add values to the data table 220.

In the context of blue-green deployment of an upgrade (e.g., a blue runtime for production use of V1, a green runtime for deployment of V2, and subsequent production switch from blue to green), the application server 202, the access schema 212, and the data schema 210 can be collectively considered a blue runtime. In some examples, the access schema 212 enables components executing in the application server 202 to interact with data stored in the database system 204 (e.g., the application 206 can query the data).

In accordance with implementations of the present disclosure, an upgrade from V1 to V2 can be initiated by an upgrade tool using an upgrade package. For example, and with reference to FIG. 2B, an upgrade tool 230 can initiate deployment of an upgrade package. The upgrade package can include an upgrade configuration that defines, among other information, changes that are to be included as part of V2. Example changes can include, without limitation, structural changes and content (e.g., new features of the data dictionary activator together with data dictionary objects, such as table definitions, view definitions, and the like that use the new features). In the example of SAP S/4HANA Cloud Public Edition, the upgrade tool 230 can be provided as a transport control program (tp), which can be described as a utility for executing upgrade procedures and can be called by one or more other programs (e.g., r3up).

Figure 2B:
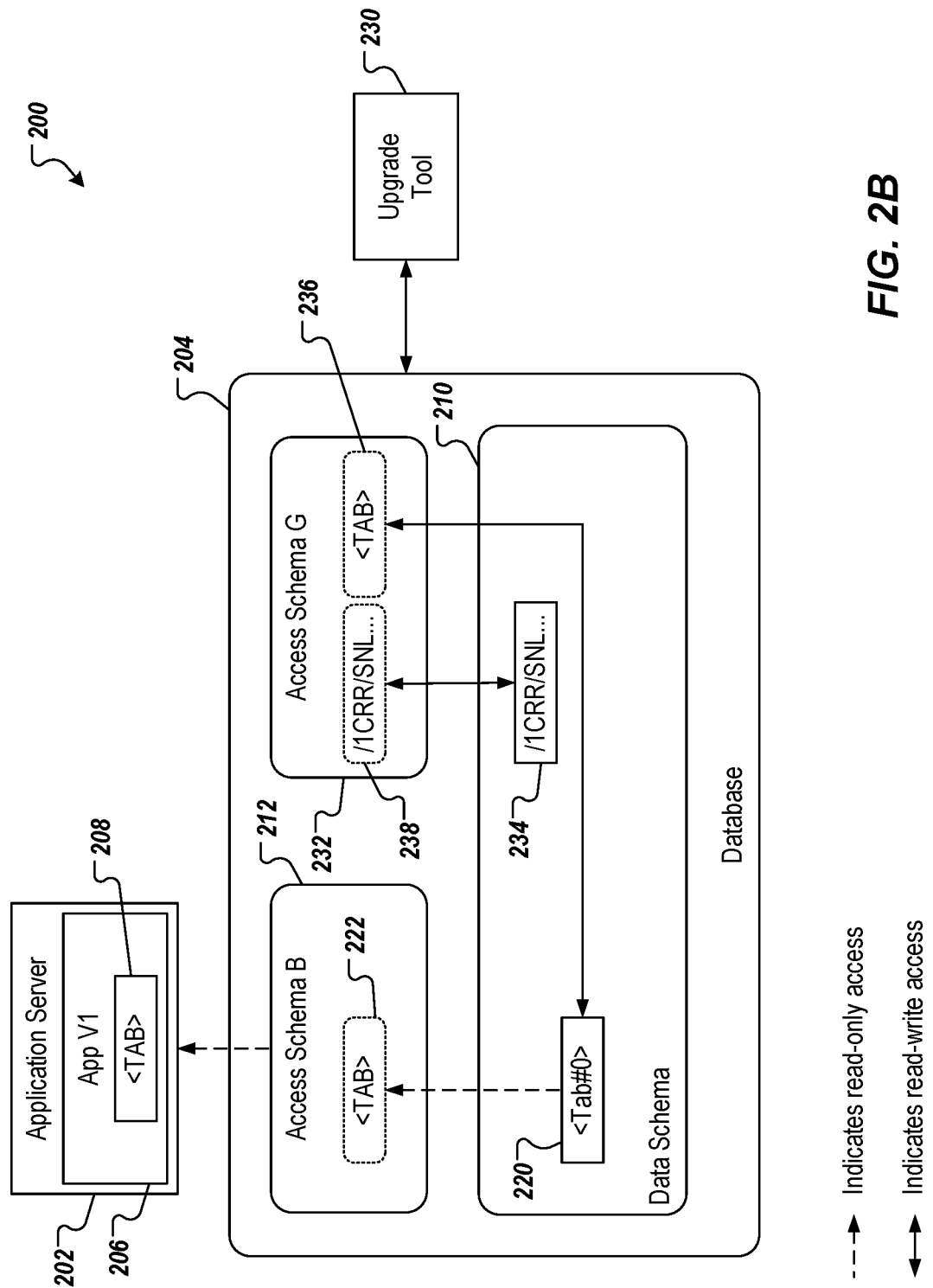

FIG. 2B depicts initial activities executed during the upgrade procedure. In the example of FIG. 2B, the upgrade tool 230 creates an access schema 232 (green access schema) and a snapshot table 234 in the database system 204. The access schema 232 includes a projection view 236 on the data table 220 and a snapshot projection view 238 on the snapshot table 234. During this time, values of the data table 220 can still be provided to the application server 202 through the access schema 212. In the depicted example, read-write access is provided to the data table 220 through the projection view 236. Also, read-write access is provided to the snapshot table 234 through the snapshot projection view 238. In this manner, values can be read from and/or written to each of the data table 220 and the snapshot table 234 during the upgrade procedure, as described in further detail herein.

In some implementations, a projection view, a snapshot projection view, and a snapshot table can be provided for multiple data tables in the data schema. For example, and as noted above, the database system 204 can store hundreds to thousands of data tables, all of the data tables stored in the database system 204 can be considered a superset of data tables. In some examples, a set of data tables can be determined for the upgrade procedure. That is, it can occur that not all tables in the database system 204 are impacted by the upgrade procedure.

In view of this, implementations of the present disclosure can determine the set of data tables from the superset of data tables based on, for example, the upgrade package. In some examples, the upgrade package can include, among other information, a list of data tables that are to be impacted by the upgrade procedure. In some examples, a projection view, a snapshot projection view, and a snapshot table can be provided for each data table in the set of data tables. In some examples, a sub-set of data tables can be determined for the upgrade procedure from the set of data tables. That is, it can occur that not all tables in the set of data tables are to be handled in accordance with implementations of the present disclosure. In some examples, the sub-set of data tables includes read-only data tables that are included in the set of data tables. An example read-only data table can include a shared data table (e.g., shared by all tenants of the database system 204). In some examples, a projection view, a snapshot projection view, and a snapshot table can be provided for each data table in the set of data tables.

Figure 2C:
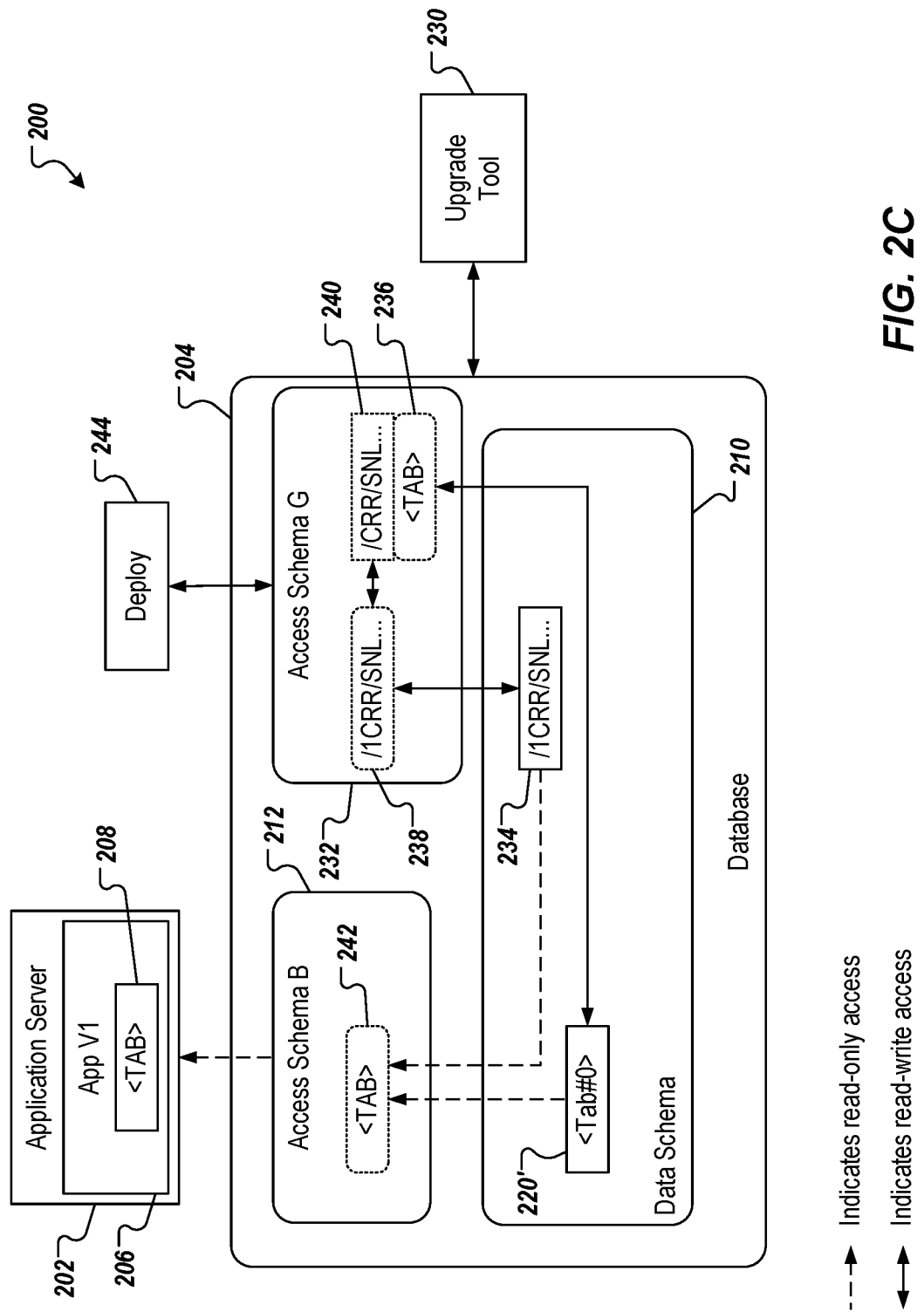

Continuing, and with reference to FIG. 2C, the upgrade tool 230 can add one or more database triggers 240 to the projection view 236, can remove the projection view 220, and can add a union view 242. As described in further detail herein, the union view 242 replaces the projection view 222 to enable the application 206 with continued access to values stored in the data table 220. It can be noted that switching from the projection view 222 to the union view 242 can occur without significant disruption to the application 206, such that the zero-downtime paradigm is maintained. Listing 1 provides example code for a union view:

Listing 1: Example Union View Code

```
CREATE VIEW "SAPABAPVL"."ZTESTDATA" ("KEY1", "KEY2", "DATA1")
AS (((SELECT "KEY1", "KEY2", "DATA1" FROM
"SAPABAPVL"."ZTESTDATA" O
   where not exists (select * from
"SAPABAP"."/1CRR/SNL0000001" 1
      where o."KEY1" = 1."KEY1" AND o."KEY2" =
1."KEY2"))
UNION ALL
(select s."KEY1", s."KEY2", s."DATA1" from
"SAPABAP"."/1CRR/SNL0000001" S
   where s.CRR_OP = 'U' OR s.CRR_OP = 'D')))
WITH READ ONLY
```

Here, ZTESTDATA corresponds to the data table 220, /1CRR/SNL0000001 corresponds to the snapshot table 234, and CRR_OP indicates an operation performed on a respective record of the snapshot table 234 during an upgrade (e.g., U=update, D=delete). Listings 2-4 provide example code for database triggers:

Listing 2: Example Code for Insert Trigger

```
CREATE TRIGGER "SAPABAPVL"."/1CRR/SNL0000001_I" AFTER INSERT
ON "APABAPVL"."ZTESTDATA" REFERENCING NEW ROW NEWROW FOR EACH
ROW
BEGIN
  DECLARE EXIT HANDLER FOR SQL_ERROR CODE 301 BEGIN END;
  INSERT INTO "/1CRR/SNL0000001" ("KEY1", "KEY2", "DATA1",
  "CRR_OP") VALUES (:newrow."KEY1", :newrow."KEY2", null,
  'I');
END;
```

Listing 3: Example Code for Delete Trigger

```
CREATE TRIGGER "SAPABAPVL"."/1CRR/SNL0000001_D" AFTER DELETE
ON "SAPABAPVL"."ZTESTDATA" REFERENCING OLD ROW OLDROW FOR EACH
ROW
BEGIN
  DECLARE EXIT HANDLER FOR SQL_ERROR_CODE 301 BEGIN END;
  INSERT INTO "/1CRR/SNL0000001" ("KEY1", "KEY2", "DATA1",
  "CRR_OP") VALUES (:oldrow."KEY1", :oldrow."KEY2",
  :oldrow."DATA1", 'D' ) ;
END;
```

Listing 4: Example Code for Update Trigger

```
CREATE or REPLACE TRIGGER "SAPABAPVL"."/1CRR/SNL0000001_U"
AFTER UPDATE ON "SAPABAPVL"."ZTESTDATA" REFERENCING OLD ROW
OLDROW, NEW ROW NEWROW FOR EACH ROW
BEGIN
   DECLARE EXIT HANDLER FOR SQL ERROR CODE 301 BEGIN END;
      IF (:newrow."KEY1" = :oldrow."KEY1") AND :newrow."KEY2" =
      :oldrow."KEY2") THEN
         INSERT INTO "/1CRR/SNL0000001" ("KEY1", "KEY2", "DATA1",
         "CRR_OP") VALUES (:oldrow."KEY1", :oldrow."KEY2",
         :oldrow."DATA1", 'U' ) ;
      END IF;
END;
```

Accordingly, although the example of FIG. 2C depicts a single database trigger 240, multiple database triggers can be provided (e.g., an insert trigger, a delete trigger, an update trigger).

In some implementations, a data deploy tool 244 (e.g., R3trans) is called (e.g., by the upgrade tool 230) to deploy target release table definitions to data tables in the database system 204, such as the data table 220. This can include inserting records to the data table 220, deleting records from the data table 220, and/or updating (modifying) data records in the data table 220 during the upgrade procedure. In view of such changes, the data table 220 can be provided as a data table 220' that includes changes resulting from the upgrade procedure.

In some implementations, each change to the data table 220 is recorded in the snapshot data table 234. In some examples, each change is applied to the data table 220 through the database trigger 240 and the projection view 240. In response to a change, the database trigger 240 functions to record a respective original record in the snapshot table 234 through the projection view 238 denoting the operation performed on the record.

In accordance with implementations of the present disclosure, the union view 242 reads values from the data table 220' and the snapshot table 234, unions the values and provides the result to the application 206. In this manner, during the upgrade procedure the application 206 has production access to original records of the data table 220 (i.e., records unchanged by the upgrade procedure). For example, the application 206 can submit queries to the database system and records that are responsive to the queries can be returned using the data table 220' and the snapshot table 234. In response to a query, the table 208 is only populated with records of the original data table 220. The union view 242 selects records from the data table 220' that do not have corresponding records in the snapshot table 234 (i.e., records that have been unchanged by the upgrade procedure to this point). Here, a corresponding record is a record that includes the same key value(s). That is, if a record of the data table 220' does not include a corresponding record in the snapshot table 234, the record is returned by the union view 242. Further, the union view selects records from the snapshot table 234 that were input to the snapshot table 234 as a result of an update operation or a delete operation.

FIGS. 3A-3D depict example changes that can be executed during an upgrade procedure in accordance with implementations of the present disclosure.

Figure 3A:
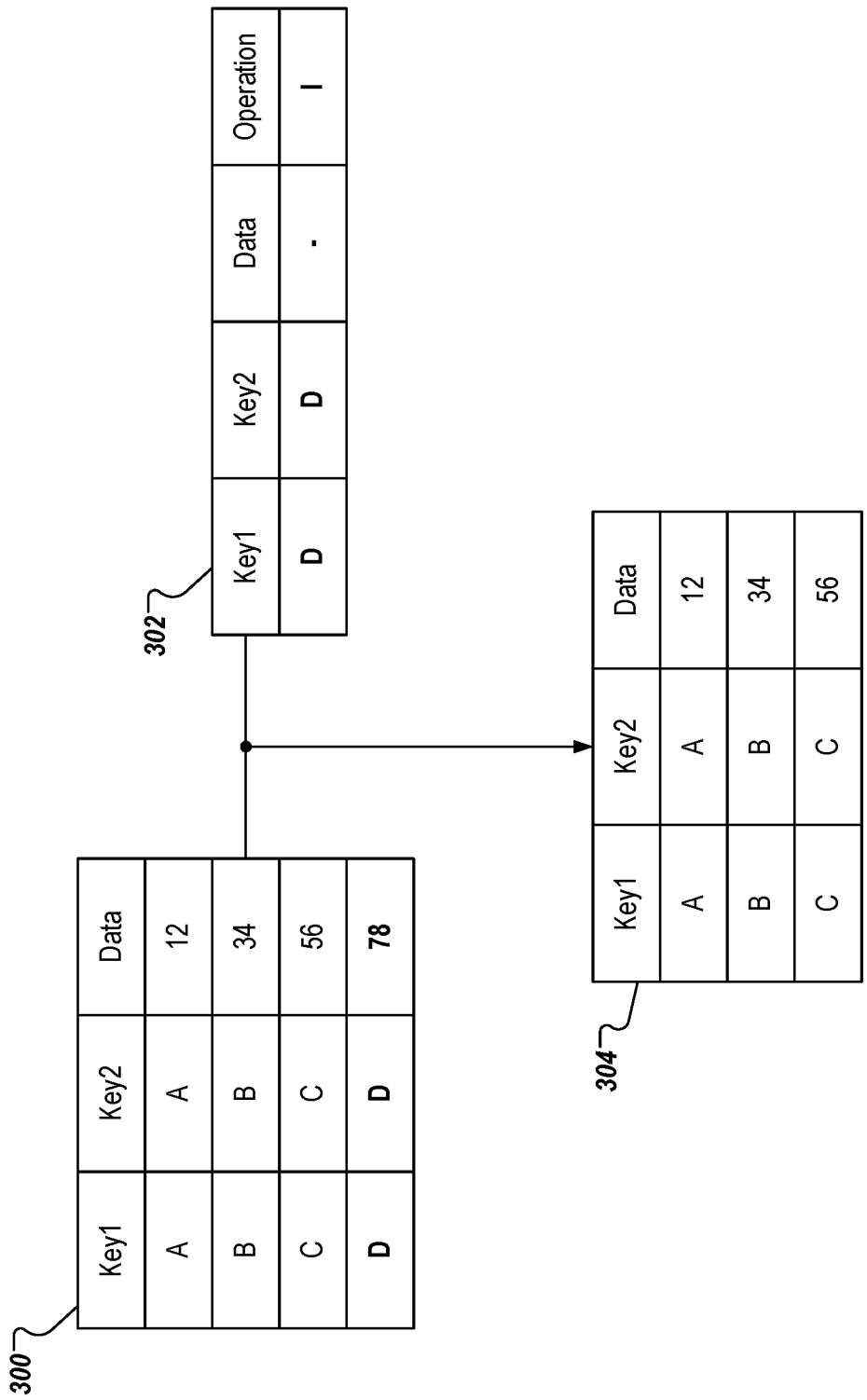
FIGS. 3A-3D depict example changes that can be executed during an upgrade procedure in accordance with implementations of the present disclosure.

FIG. 3A represents execution of an insert operation and includes a data table 300 (e.g., the data table 220, 200'), a snapshot table 302 (e.g., the snapshot table 234), and a union view 304 (e.g., the union view 242). In the example of FIG. 3A, the insert operation inserts a record having a first key D, a second key D, and data 78 into the data table 300, and the change is recorded in the snapshot table with an identifier denoting the type of change (e.g., "CRR_OP"= 'I'). In the example of FIG. 3A, the union view 304 only selects data records from the data table 300 that are not recorded in the snapshot table 302. Consequently, the union view 304 returns the data table 300 without the insertion. That is, because the record [D, D, 78] exists in both the data table 300 and the snapshot table 302, the union view 304 only returns the records [A, A, 12], [B, B, 34], and [C, C, 56].

Figure 3B:
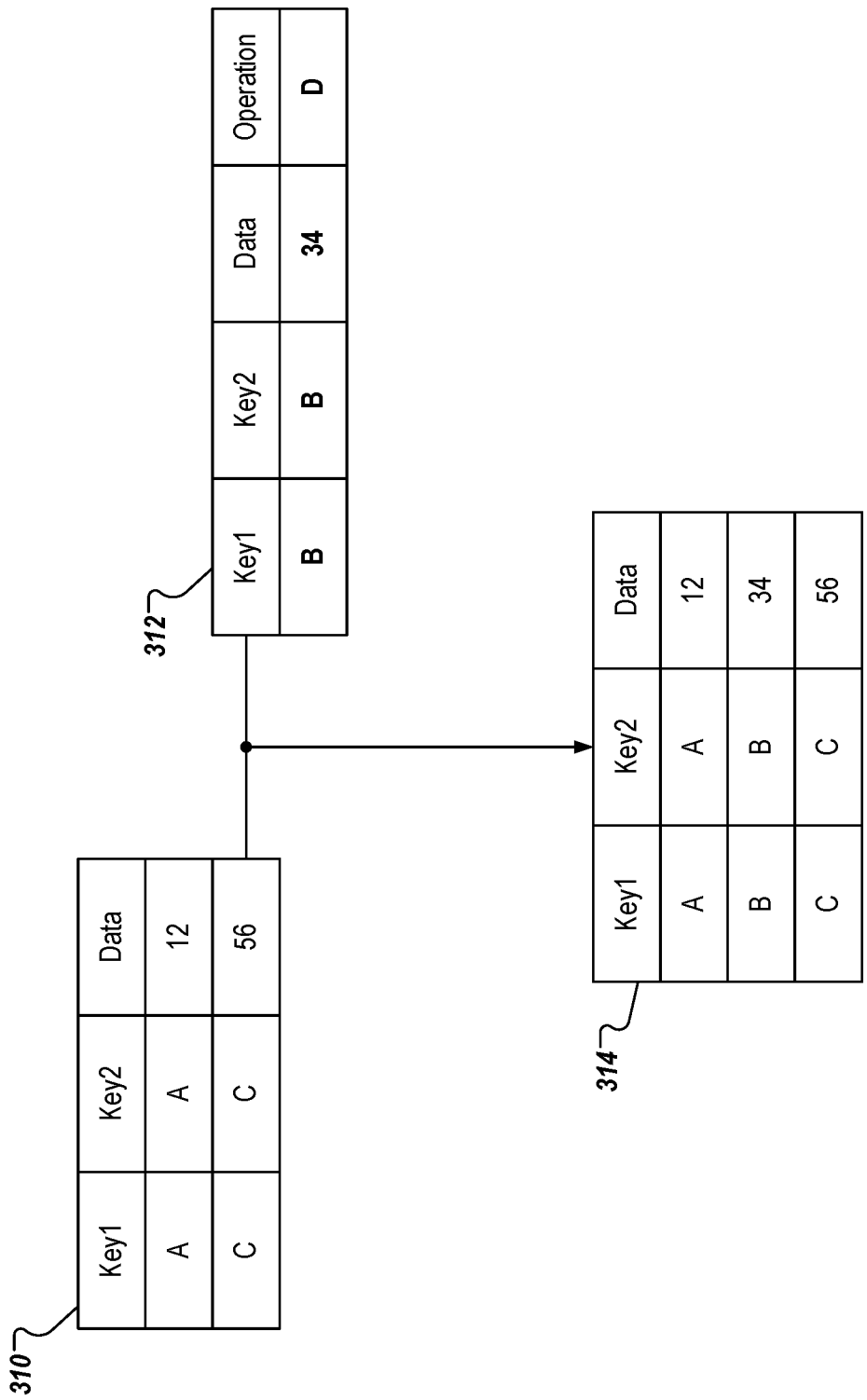

FIG. 3B represents execution of a delete operation and includes a data table 310 (e.g., the data table 220, 200'), a snapshot table 312 (e.g., the snapshot table 234), and a union view 314 (e.g., the union view 242). In the example of FIG. 3B, the delete operation deletes a record having a first key B, a second key B, and data 34 from the data table 310, and the change is recorded in the snapshot table with an identifier denoting the type of change (e.g., "CRR_OP"=\D'). In the example of FIG. 3B, the union view 314 selects data records from the data table 310 that are not recorded in the snapshot table 312 and selects data records from the snapshot table 312 that include the delete identifier (e.g., "CRR_OP"= 'D'). Consequently, the union view 314 returns the data table 310 without the deletion.

Figure 3C:
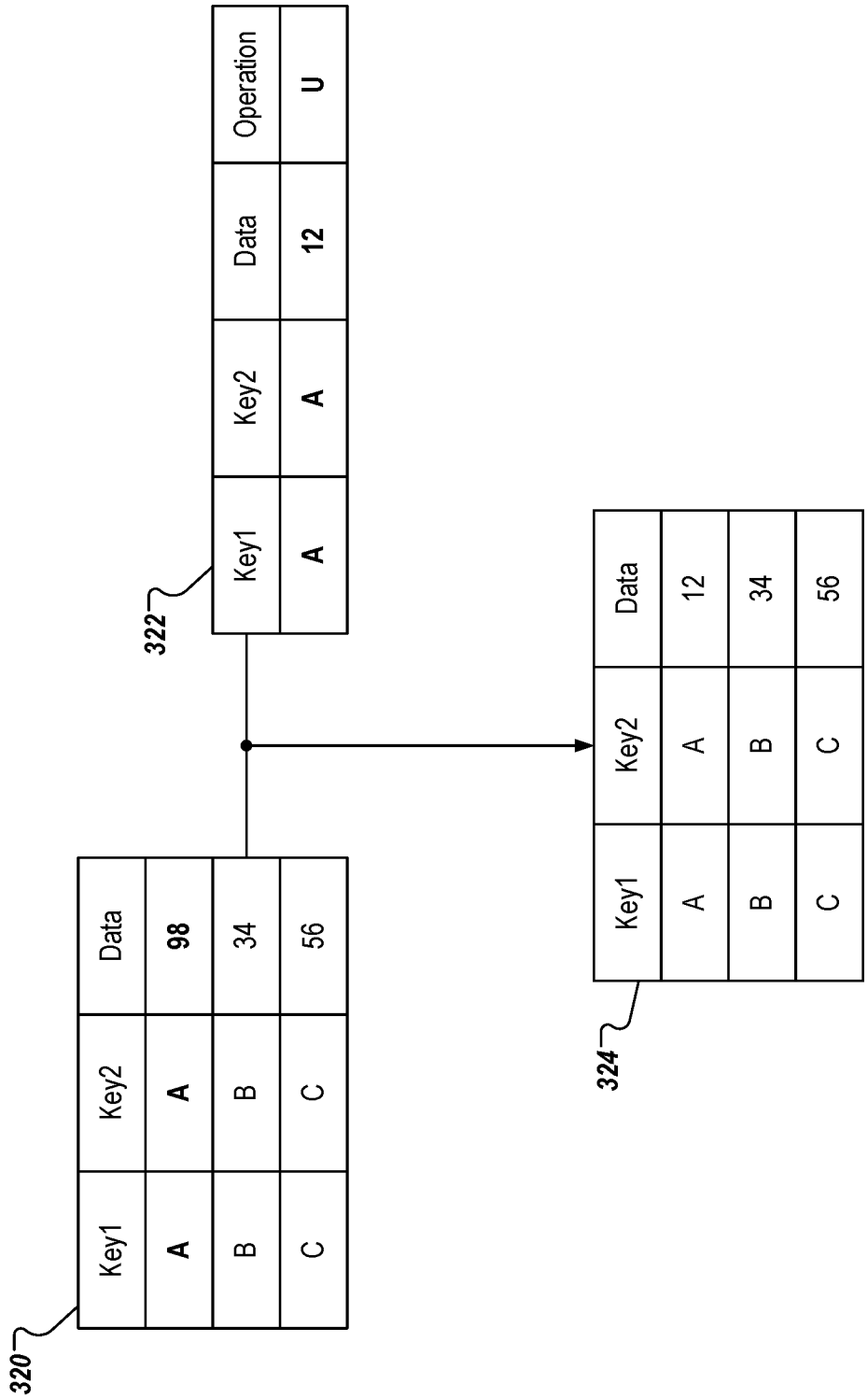

FIG. 3C represents execution of an update operation and includes a data table 320 (e.g., the data table 220, 200'), a snapshot table 322 (e.g., the snapshot table 234), and a union view 324 (e.g., the union view 242). In the example of FIG. 3C, the update operation updates a record having a first key A and a second key A from data 12 to data 98, and the change is recorded in the snapshot table with an identifier denoting the type of change (e.g., "CRR_OP"= 'U'). In the example of FIG. 3C, the union view 324 selects data records from the data table 310 that are not recorded in the snapshot table 322 and selects data records from the snapshot table 322 that include the update identifier (e.g., "CRR_OP"= 'U'). Consequently, the union view 314 returns the data table 310 without the update.

Figure 3D:
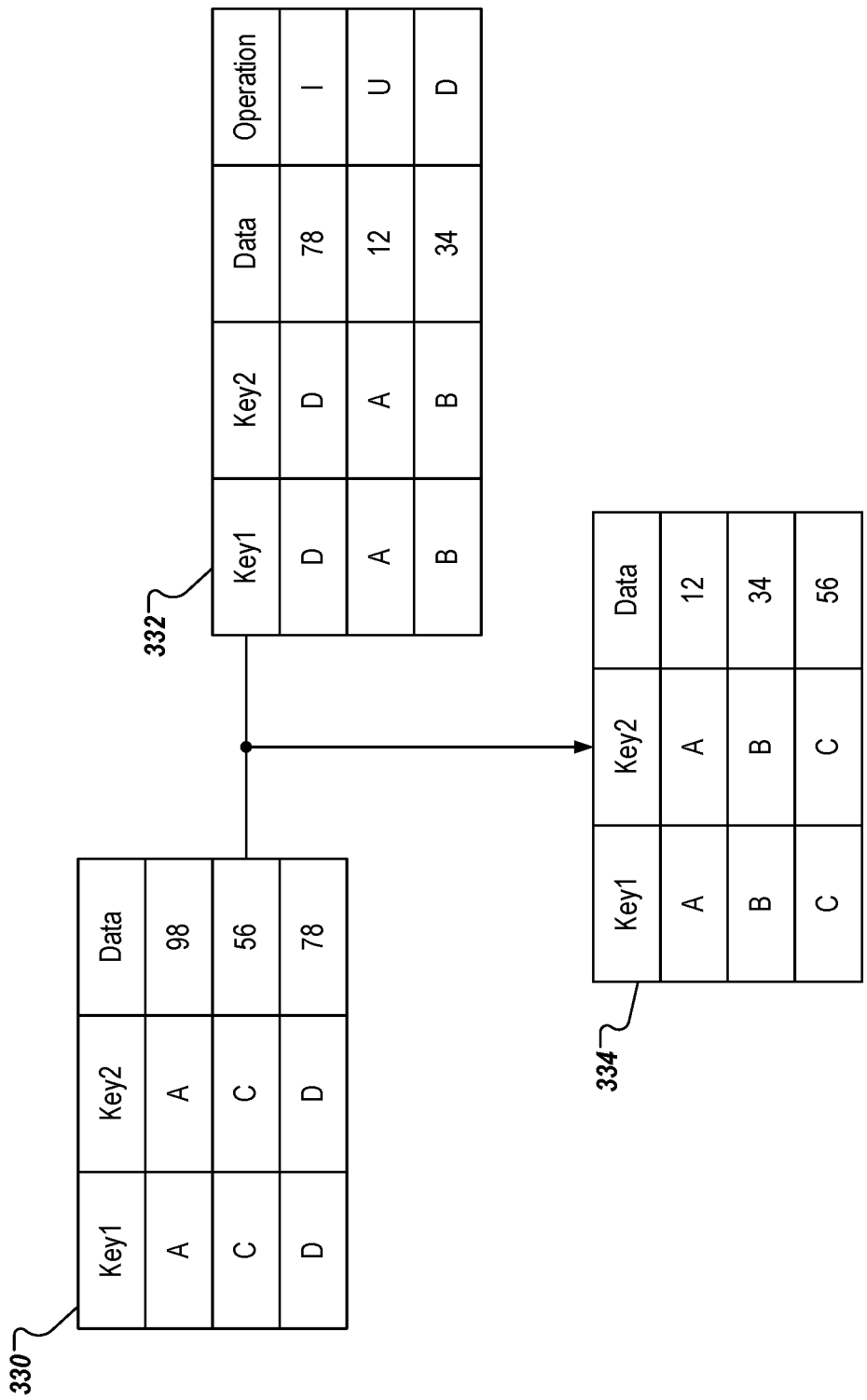

FIG. 3D represents collective execution of the insert operation, the delete operation, and the update operation represented in FIGS. 3A-3C and includes a data table 330 (e.g., the data table 220, 200'), a snapshot table 332 (e.g., the snapshot table 234), and a union view 334 (e.g., the union view 242). In the example of FIG. 3D, the data table 330 represents changes resulting from the upgrade procedure and the snapshot table 332 records the respective changes. The union view 334 combines records of the data table 330 and records of the snapshot table 332 to return records that collectively represent the data table 330 before any changes of the upgrade procedure.

Returning to FIG. 2C, the upgrade procedure continues until either completing or aborting (e.g., in response to a failure). In some examples, if the upgrade procedure fails and is aborted, the snapshot table 234 can be used to undo changes to the data table 220' to revert back to its original state before execution of changes (e.g., back to the data table 220). For example, any records indicated as deleted in the snapshot table 234 can be inserted into the data table 220', any records indicated as inserted in the snapshot table 234 can be deleted from the data table 220', and any records indicated as updated can have their values changed back in the data table 220'.

Figure 2D:
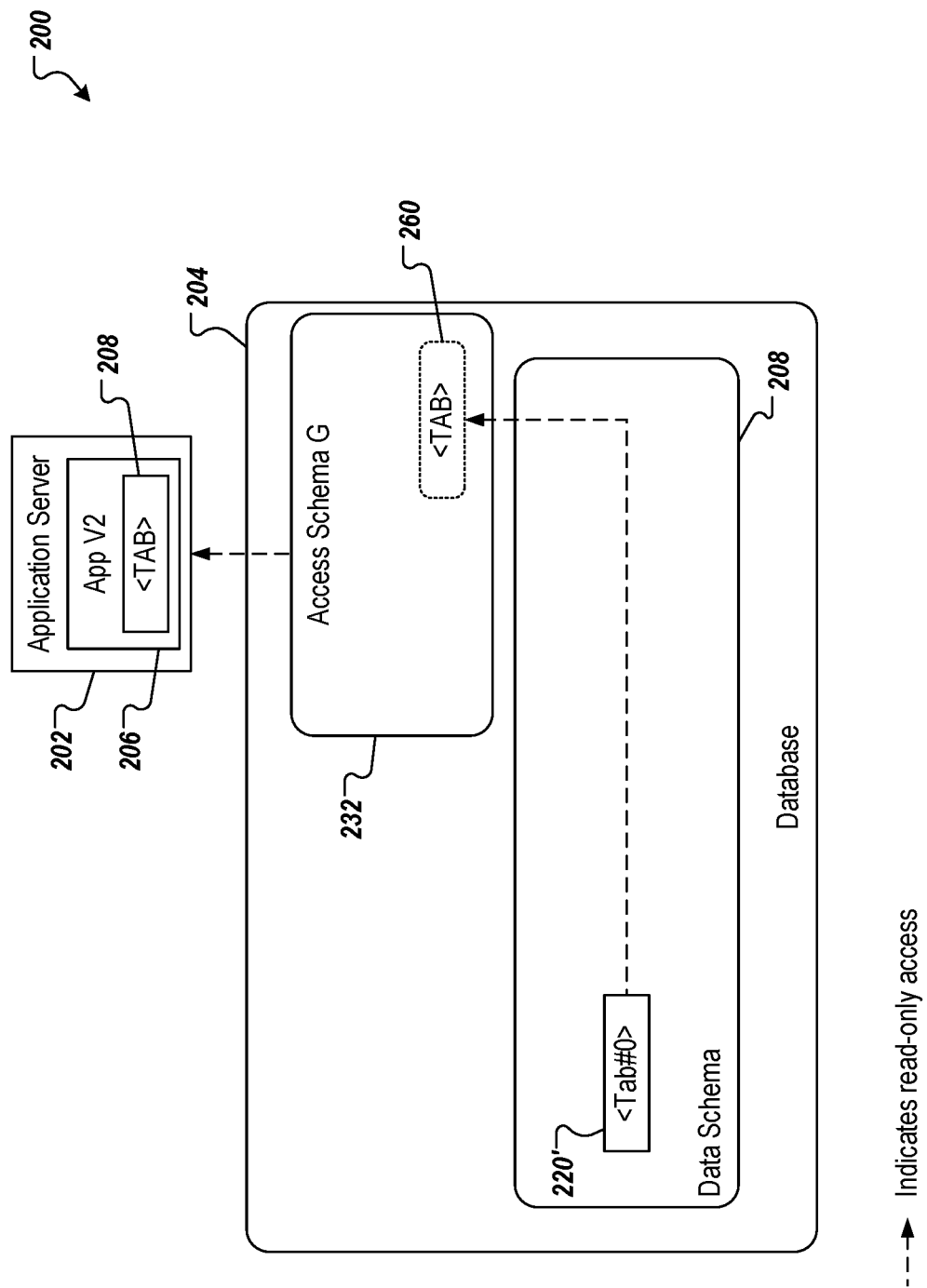

If the upgrade procedure successfully completes, a switch is made to the new release (V2). For example, FIG. 2D depicts a switch to the new release. In the example of FIG. 2D, the access schema 212 is deactivated and access to the data table 220' moves to the access schema 232 through the projection view 236. The snapshot projection view 238, the snapshot table 234, and the database trigger 240 are deleted.

Figure 4:
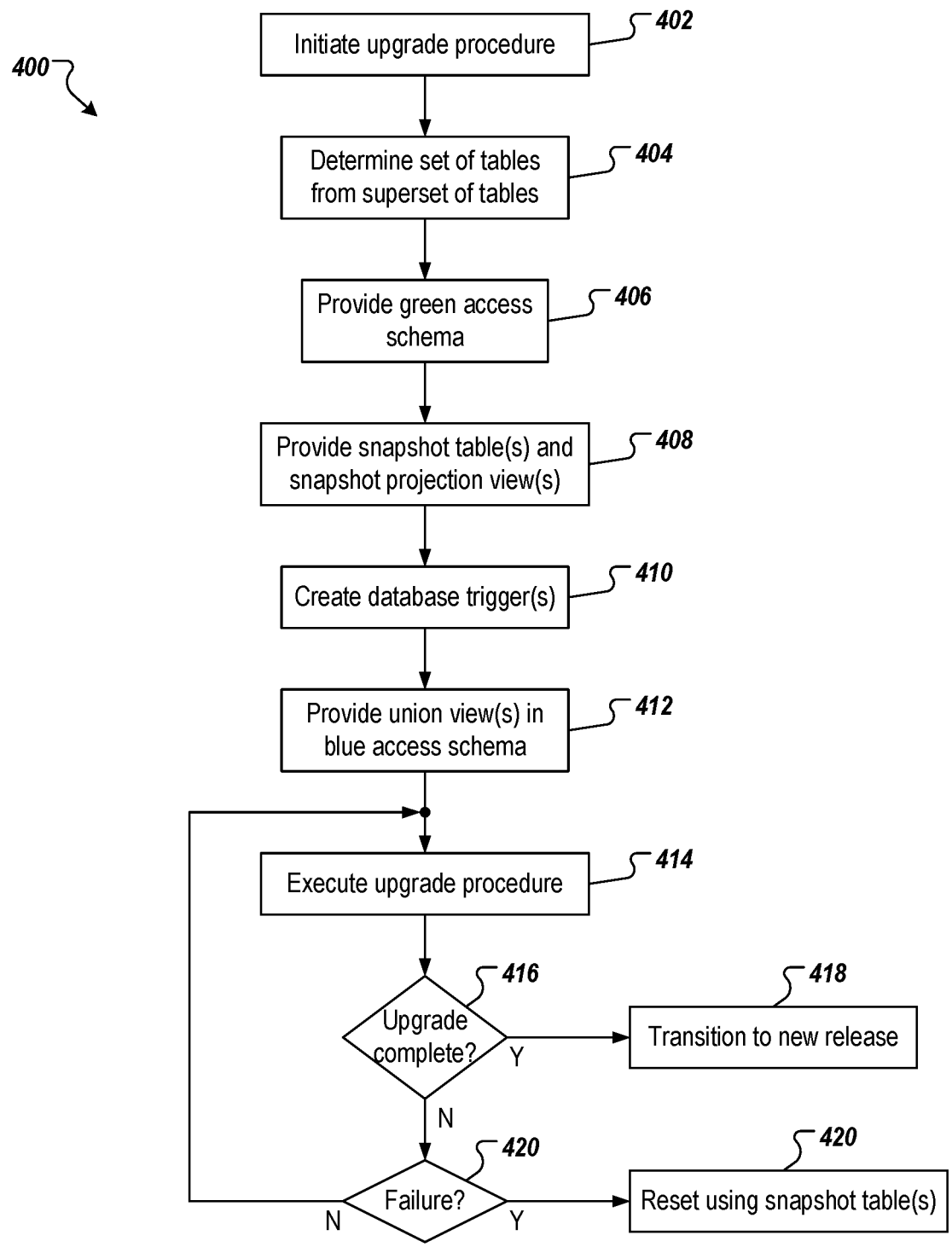
FIG. 4 depicts an example process that can be executed in accordance with implementations of the present disclosure.

FIG. 4 depicts an example process 400 that can be executed in accordance with implementations of the present disclosure. In some examples, the example process 400 is provided using one or more computer-executable programs executed by one or more computing devices. In some examples, the example process 400 represents execution of an upgrade from an old release (V1) to a new release (V2).

An upgrade procedure is initiated (402). For example, and as described in detail herein, the upgrade tool 230 of FIGS. 2B and 2C (e.g., prompted by a user) can initiate an upgrade procedure to the database system 204. A set of data tables is determined from a superset of data tables (404). For example, and as described in detail herein, the set of data tables can be determined from the superset of data tables based on, for example, the upgrade package. In some examples, the upgrade package can include, among other information, a list of data tables that are to be impacted by the upgrade procedure. In some examples, the set of data tables only includes read-only data tables.

A green access schema is provided (406). For example, and as described in detail herein, the upgrade tool 230 can provide the access schema 232 in the database system 204. One or more snapshot tables and one or more projection view(s) are provided (408). As described in detail herein, a snapshot table, a snapshot projection view, and a projection view can be provided for each data table in the set of data tables (e.g., the read-only data tables that will be impacted by the upgrade procedure). For example, the snapshot table 234 is provided in the data schema 210 and the snapshot projection view 238 and the projection view 236 are provided in the access schema 232.

One or more database triggers are created (410). For example, and as described in detail herein, the database trigger 240 is created in the access schema 232. In some examples, multiple database triggers are provided (e.g., an insert trigger, a delete trigger, an update trigger). One or more union views are provided in the blue access schema (412). For example, and as described in detail herein, the union view 242 is created in the access schema 212 and replaces the projection view 222.

An upgrade procedure is executed (414). For example, and as described in detail herein, the upgrade procedure is executed to provide changes to data tables in the set of data tables. As discussed herein, changes can result from one or more of insert operations, delete operations, and update operations to data tables. In the example of FIG. 2C, changes can be made to the data table 220', which changes are recorded in the snapshot table 234 through the snapshot projection view 238 and the database trigger(s) 240.

It is determined whether the upgrade procedure has completed (416). If the upgrade procedure has completed, transition to the new release is executed (418). For example, and as described in detail herein with reference to FIG. 2D, the access schema 212 is deactivated and access to the data table 220' moves to the access schema 232 through the projection view 236. The snapshot projection view 238, the snapshot table 234, and the database trigger 240 are deleted. If the upgrade procedure has not completed, it is determined whether the upgrade procedure has failed (420). If the upgrade procedure has not failed, the example process 400 loops back to continue execution of the upgrade procedure. If the upgrade procedure has failed, a reset can be performed using the one or more snapshot tables (420). For example, and as described in detail herein, the snapshot table 234 can be used to undo changes to the data table 220' to revert back to its original state before execution of changes (e.g., back to the data table 220). For example, any records indicated as deleted in the snapshot table 234 can be inserted into the data table 220', any records indicated as inserted in the snapshot table 234 can be deleted from the data table 220', and any records indicated as updated can have their values changed back in the data table 220'.

Figure 5:
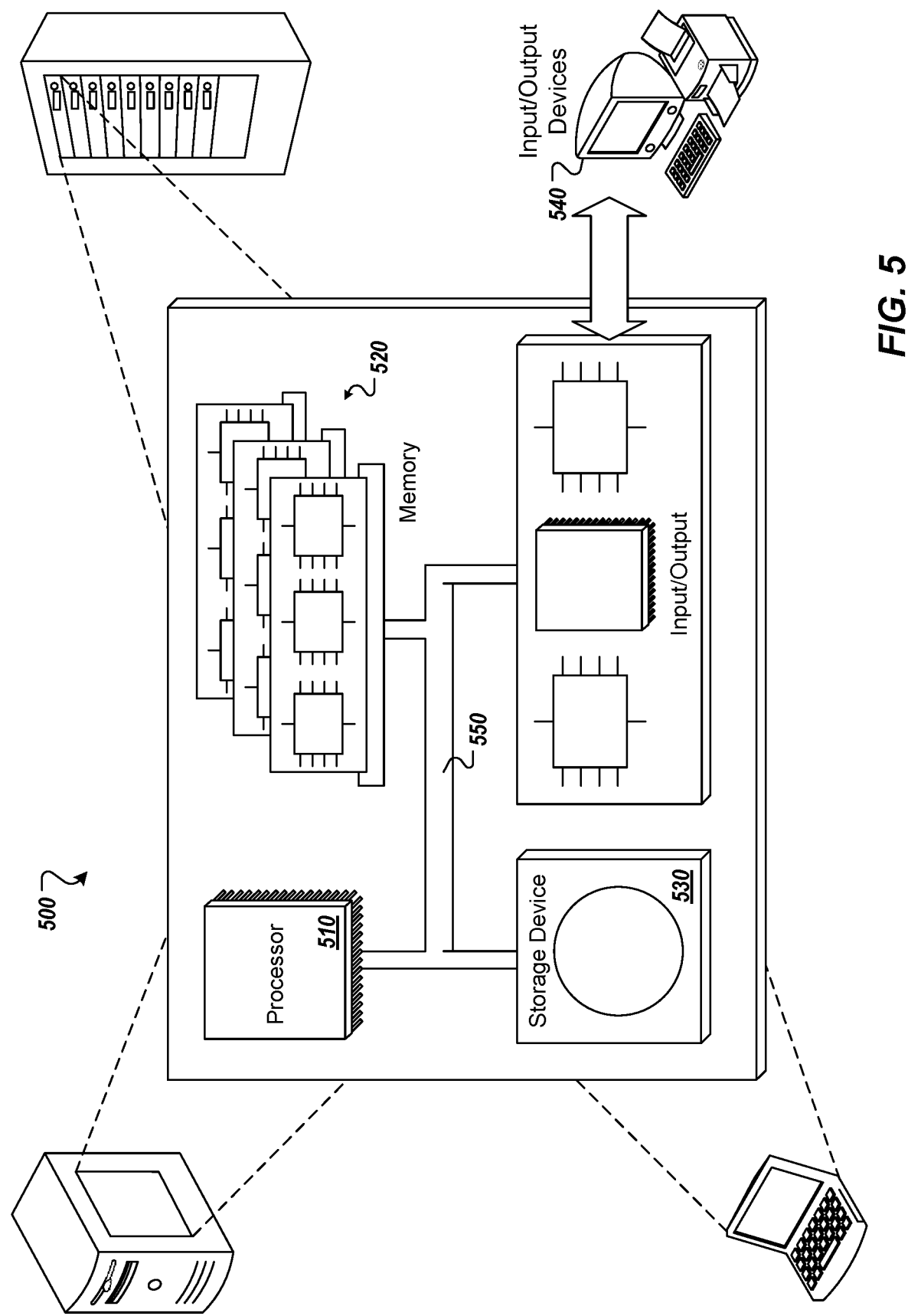
FIG. 5 is a schematic illustration of example computer systems that can be used to execute implementations of the present disclosure.

Referring now to FIG. 5, a schematic diagram of an example computing system 500 is provided. The system 500 can be used for the operations described in association with the implementations described herein. For example, the system 500 may be included in any or all of the server components discussed herein. The system 500 includes a processor 510, a memory 520, a storage device 530, and an input/output device 540. The components 510, 520, 530, 540 are interconnected using a system bus 550. The processor 510 is capable of processing instructions for execution within the system 500. In some implementations, the processor 510 is a single-threaded processor. In some implementations, the processor 510 is a multi-threaded processor. The processor 510 is capable of processing instructions stored in the memory 520 or on the storage device 530 to display graphical information for a user interface on the input/output device 540.

The memory 520 stores information within the system 500. In some implementations, the memory 520 is a computer-readable medium. In some implementations, the memory 520 is a volatile memory unit. In some implementations, the memory 520 is a non-volatile memory unit. The storage device 530 is capable of providing mass storage for the system 500. In some implementations, the storage device 530 is a computer-readable medium. In some implementations, the storage device 530 may be a floppy disk device, a hard disk device, an optical disk device, or a tape device. The input/output device 540 provides input/output operations for the system 500. In some implementations, the input/output device 540 includes a keyboard and/or pointing device. In some implementations, the input/output device 540 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier (e.g., in a machine-readable storage device, for execution by a programmable processor), and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. Elements of a computer can include a processor for executing instructions and one or more memories for storing instructions and data. Generally, a computer can also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, for example, a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

A number of implementations of the present disclosure have been described. Nevertheless, it will be understood that various modifications may be made without departing from the spirit and scope of the present disclosure. Accordingly, other implementations are within the scope of the following claims.

What is claimed is:

1. A computer-implemented method for execution of an upgrade procedure for a database system, the method being executed by one or more processors and comprising:
    providing, in a database system, a snapshot table;
    replacing, in a first access schema of an access layer, a first projection view into records of a data table with a union view into records of the data table and records of the snapshot table;
    creating, in a second access schema, a snapshot projection view, a second projection view, and a set of database triggers; and
    during execution of an upgrade procedure that results in changes to records of the data table:
        recording the changes to the records of the data table in the snapshot table, each change being implemented through the second projection view,
        for each record of the data table changed by the upgrade procedure, providing the record in the snapshot table in an unchanged state through at least one database trigger of the set of database triggers and the snapshot projection view, and
        returning a set of records through the union view in response to a query, the set of records comprising a first sub-set of records of the data table and a second sub-set of records of the snapshot table.

2. The method of claim 1, wherein, in response to the query, the first sub-set of records includes records of the data table that are absent a corresponding record in the snapshot table.

3. The method of claim 1, wherein, in response to the query, the second sub-set of records includes at least one record that had been deleted from the data table by the upgrade procedure.

4. The method of claim 1, wherein recording the changes to the records of the data table in the snapshot table comprises, for each record, recording a type of change associated with the record.

5. The method of claim 1, wherein the set of database triggers comprises one or more of an update trigger, a delete trigger, and an insert trigger.

6. The method of claim 1, further comprising, after completion of the upgrade procedure, switching production access to the data table to be through the second access schema.

7. The method of claim 1, further comprising, prior to completion of the upgrade procedure, determining that the upgrade procedure is to be aborted, and in response, restoring the data table to a pre-upgrade state using the snapshot table.

8. A non-transitory computer-readable storage medium coupled to one or more processors and having instructions stored thereon which, when executed by the one or more processors, cause the one or more processors to perform operations for execution of an upgrade procedure for a database system, the operations comprising:
    providing, in a database system, a snapshot table;
    replacing, in a first access schema of an access layer, a first projection view into records of a data table with a union view into records of the data table and records of the snapshot table;

creating, in a second access schema, a snapshot projection view, a second projection view, and a set of database triggers; and during execution of an upgrade procedure that results in changes to records of the data table:

recording the changes to the records of the data table in the snapshot table, each change being implemented through the second projection view, for each record of the data table changed by the upgrade procedure, providing the record in the snapshot table in an unchanged state through at least one database trigger of the set of database triggers and the snapshot projection view, and returning a set of records through the union view in response to a query, the set of records comprising a first sub-set of records of the data table and a second sub-set of records of the snapshot table.

9. The non-transitory computer-readable storage medium of claim 8, wherein, in response to the query, the first sub-set of records includes records of the data table that are absent a corresponding record in the snapshot table.

10. The non-transitory computer-readable storage medium of claim 8, wherein, in response to the query, the second sub-set of records includes at least one record that had been deleted from the data table by the upgrade procedure.

11. The non-transitory computer-readable storage medium of claim 8, wherein recording the changes to the records of the data table in the snapshot table comprises, for each record, recording a type of change associated with the record.

12. The non-transitory computer-readable storage medium of claim 8, wherein the set of database triggers comprises one or more of an update trigger, a delete trigger, and an insert trigger.

13. The non-transitory computer-readable storage medium of claim 8, wherein operations further comprise, after completion of the upgrade procedure, switching production access to the data table to be through the second access schema.

14. The non-transitory computer-readable storage medium of claim 8, wherein operations further comprise, prior to completion of the upgrade procedure, determining that the upgrade procedure is to be aborted, and in response, restoring the data table to a pre-upgrade state using the snapshot table.

15. A system, comprising:
a computing device; and
a computer-readable storage device coupled to the computing device and having instructions stored thereon which, when executed by the computing device, cause the computing device to perform operations for natural language explanations for execution of an upgrade procedure for a database system, the operations comprising:

providing, in a database system, a snapshot table;

replacing, in a first access schema of an access layer, a first projection view into records of a data table with a union view into records of the data table and records of the snapshot table;

creating, in a second access schema, a snapshot projection view, a second projection view, and a set of database triggers; and during execution of an upgrade procedure that results in changes to records of the data table:

recording the changes to the records of the data table in the snapshot table, each change being implemented through the second projection view, for each record of the data table changed by the upgrade procedure, providing the record in the snapshot table in an unchanged state through at least one database trigger of the set of database triggers and the snapshot projection view, and returning a set of records through the union view in response to a query, the set of records comprising a first sub-set of records of the data table and a second sub-set of records of the snapshot table.

16. The system of claim 15, wherein, in response to the query, the first sub-set of records includes records of the data table that are absent a corresponding record in the snapshot table.

17. The system of claim 15, wherein, in response to the query, the second sub-set of records includes at least one record that had been deleted from the data table by the upgrade procedure.

18. The system of claim 15, wherein recording the changes to the records of the data table in the snapshot table comprises, for each record, recording a type of change associated with the record.

19. The system of claim 15, wherein the set of database triggers comprises one or more of an update trigger, a delete trigger, and an insert trigger.

20. The system of claim 15, wherein operations further comprise, after completion of the upgrade procedure, switching production access to the data table to be through the second access schema.

* * * * *